United States Patent
Lee et al.

(10) Patent No.: US 12,448,048 B2
(45) Date of Patent: Oct. 21, 2025

(54) CHASSIS CAB VEHICLE

(71) Applicants: HYUNDAI MOTOR COMPANY, Seoul (KR); KIA CORPORATION, Seoul (KR)

(72) Inventors: Seung Hak Lee, Asan-si (KR); Mi Ran Park, Hwaseong-si (KR); Won Hae Lee, Seoul (KR); Ha Yeon Kwon, Seoul (KR); Byung Joo Chung, Gunpo-si (KR); Seung Min Kang, Hwaseong-si (KR); Seung Min Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 414 days.

(21) Appl. No.: 18/118,397

(22) Filed: Mar. 7, 2023

(65) Prior Publication Data
US 2024/0158015 A1 May 16, 2024

(30) Foreign Application Priority Data
Nov. 10, 2022 (KR) .................. 10-2022-0149844

(51) Int. Cl.
| | | |
|---|---|---|
| B62D 24/00 | (2006.01) | |
| B62D 21/03 | (2006.01) | |
| B62D 21/05 | (2006.01) | |
| B62D 25/02 | (2006.01) | |
| B60K 1/04 | (2019.01) | |

(52) U.S. Cl.
CPC ............ *B62D 24/00* (2013.01); *B62D 21/03* (2013.01); *B62D 21/05* (2013.01); *B62D 25/025* (2013.01); *B60K 1/04* (2013.01)

(58) Field of Classification Search
None
See application file for complete search history.

(56) References Cited

U.S. PATENT DOCUMENTS

| | | | |
|---|---|---|---|
| 4,842,326 A * | 6/1989 | DiVito | B60P 3/42 296/10 |
| 5,765,906 A * | 6/1998 | Iwatsuki | B62D 27/023 296/29 |
| 8,672,354 B2 | 3/2014 | Kim et al. | |
| 10,183,700 B2 * | 1/2019 | Hata | B62D 25/2036 |

(Continued)

FOREIGN PATENT DOCUMENTS

| | | | | |
|---|---|---|---|---|
| CN | 210122138 U | | 3/2020 | |
| DE | 102018128873 A1 * | 5/2019 | ............ B62D 21/06 |

(Continued)

*Primary Examiner* — Joseph D. Pape
(74) *Attorney, Agent, or Firm* — Lempia Summerfield Katz LLC

(57) ABSTRACT

A chassis cab vehicle includes a lower frame, which constitutes a lower structure of the vehicle and is equipped with a pair of side members extending in a lengthwise direction of the vehicle. A battery is coupled between the side members. An upper body is coupled to a front portion of the lower frame and forms a cabin interior. A side sill is formed at a lower end at each side of the upper body and extends to a rear side of the cabin interior. The side sills overlap the respective side members in a lateral direction of the vehicle when coupled to the lower frame.

14 Claims, 6 Drawing Sheets

(56) References Cited

U.S. PATENT DOCUMENTS

| | | | |
|---|---|---|---|
| 10,843,733 B2 | 11/2020 | Yoshida et al. | |
| 11,840,136 B2* | 12/2023 | Hennessey | B62D 21/07 |
| 2009/0000843 A1 | 1/2009 | Burchett et al. | |
| 2013/0175829 A1 | 7/2013 | Kim et al. | |
| 2017/0001507 A1* | 1/2017 | Ashraf | B62D 25/2027 |
| 2019/0225272 A1 | 7/2019 | Yoshida et al. | |

FOREIGN PATENT DOCUMENTS

| | | |
|---|---|---|
| JP | 2001294049 A | 10/2001 |
| JP | 2007015445 A | 1/2007 |
| JP | 2019127163 A | 8/2019 |
| KR | 20120075227 A | 7/2012 |
| KR | 20160128818 A | 11/2016 |

* cited by examiner

CHASSIS CAB VEHICLE

CROSS REFERENCE TO RELATED APPLICATION

The present application claims priority to Korean Patent Application No. 10-2022-0149844 filed on Nov. 10, 2022, the entire contents of which are incorporated herein for all purposes by this reference.

BACKGROUND

Field of the Disclosure

The present disclosure relates to a chassis cab vehicle, and more particularly, to a chassis cab vehicle with a structure in which a lower frame and an upper body are coupled and in which a response structure for a side collision of a vehicle is configurable in the upper body by extending a side sill of the upper body to a rear of a cabin interior.

Description of the Related Art

Generally, a frame refers to a basic skeleton of a chassis of a vehicle. The chassis refers to a state of the vehicle in which minimum mechanical devices necessary for vehicle traveling or driving are installed. In other words, the frame refers to a basic structure constituting the chassis on which an engine, a suspension, a brake, a clutch, wheels, a transmission, and a steering device are mounted.

Since the first deaths caused by traffic accidents, the development of conventional vehicles is linked to technological advances, which have lead to the appearance of seat belts and airbags among safety concepts. One of the first appearing concepts was a shock or impact absorption capacity of a vehicle body. When a collision occurs, a degree of safety of a driver is secured depending on how much the vehicle absorbs an impact. Thus, research on the enhancement of impact or shock absorption capacity has not stopped.

Recently, as environmental issues, energy efficiency, and safety have become more prominent in the vehicle market, the shape of a vehicle frame has been greatly influenced. Efforts are continuously being made to achieve weight reduction using lightweight materials such as engineered plastics and carbon fibers. As a result, electric vehicles have attracted attention in the future vehicle market. Thus, many changes have occurred in the structure of the frame. Also, research on lightweight materials has begun to focus more on the center of gravity of the vehicle, which affects safety and energy efficiency during traveling.

Electric vehicles have various types of frames ranging from passenger vehicles to trucks and are variously changed according to the position or purpose of a cargo container in trucks. In addition, electric vehicles are equipped with batteries capable of storing electricity and generating a driving force via an electric motor.

Accordingly, the conventional frame for an electric vehicle is formed to allow a storage battery to be seated, mounted, or installed. However, when a collision occurs, an impact of the vehicle is transmitted to the storage battery. Thus, a problem may occur such as leakage of an electrolyte or short-circuiting and a problem may occur in which a capacity of the storage battery and a replacement cycle thereof are degraded. In addition, in order to increase energy efficiency, it is necessary to have an efficient frame structure which can withstand the weight of a motor and of a battery while providing weight reduction of the frame, accommodating mounting of the battery, and protecting a high-voltage battery.

Meanwhile, in a vehicle such as a van or wagon in which a loading body is present at a rear of a cabin interior, a structure for a side collision of the vehicle is generally configured in an upper body. However, in the case of a chassis cab vehicle that does not include a loading body such as a cargo at the rear of the cabin interior, a structure for a side collision of a vehicle is additionally configured in a lower frame to protect a battery disposed at a lower portion of the vehicle.

The chassis cab vehicle has only a lower frame for mounting the loading body to the rear of the cabin interior. Thus, in order to protect the battery in case of a side collision of the vehicle, collision members, such as a number of fixing brackets and protruding materials may be additionally configured at an outer side of the vehicle, i.e., the battery. In addition, a collision member provided at the rear of the cabin interior cannot protect the battery in a structure where the battery is positioned below the cabin interior. Thus, there are problems in that application of an additional protection structure is required to increase the weight. Also, connectivity between the additional protection structure and the collision member is degraded so that support rigidity of the lower frame is decreased.

The foregoing is intended merely to aid in the understanding of the background of the present disclosure, and is not intended to mean that the present disclosure falls within the purview of the related art that is already known to those having ordinary skill in the art.

SUMMARY

In view of the foregoing, a method of protecting a battery when a side collision of a vehicle occurs and securing connectivity between an upper body and a lower frame without configuring a collision member as a separate product is required.

Accordingly, the present disclosure has been made keeping in mind the above problems occurring in the related art. The present disclosure is intended to propose a chassis cab vehicle with a structure in which a lower frame and an upper body are coupled, and in which a response structure for a side collision of a vehicle is provided. The response structure is configured in the upper body by extending a side sill of the upper body to a rear of a cabin interior. Thus, the side sill is spaced apart from a side member to reduce an impact force and a separate structure for the side member is not required so that the chassis cab vehicle is capable of reducing a weight of a lower frame.

The technical problems to be solved by the present disclosure are not limited to the above-mentioned technical problems. Other technical problems, which are not mentioned herein can be clearly understood by those having ordinary skill in the art to which the present disclosure pertains from the following description.

According to one aspect, a chassis cab vehicle is provided and includes a lower frame, which constitutes a lower structure of a vehicle and is equipped with a pair of side members extending in a lengthwise direction of a vehicle and in which a battery is coupled between the side members at both sides of the lower frame. The chassis cab vehicle also includes an upper body, which is coupled to a front portion of the lower frame to form a cabin interior. The upper body has side sills formed at a lower end and extending to a rear of the cabin interior and the side sills overlap the respective side members in a lateral direction of the vehicle when coupled to the lower frame.

For example, the lower frame may include a front lower frame, a central lower frame, and a rear lower frame based on a front-rear direction of the vehicle. The side sills may extend from the rear side of the cabin interior to a central portion of the lower frame.

For example, the lower frame may be formed in a shape in which a width of the lower frame is decreased from the rear lower frame to the front lower frame.

For example, the central portion of the lower frame may be recessed downward and both end portions of the central lower frame may be formed to be bent outward to extend and connect to the front lower frame and the rear lower frame.

For example, when the upper body is coupled to the lower frame, the side sills may overlap the respective side members in the lateral direction of the vehicle and the upper body may be fixed by a plurality of fixing parts.

For example, the plurality of fixing parts may be provided on the lower frame and include a first mounting part, a second mounting part, and a third mounting part on each side thereof. The first mounting parts, the second mounting parts, and the third mounting parts may be disposed to be spaced apart from each other in the lengthwise direction of the vehicle on each side.

For example, the side sills may be spaced apart from the respective side members in a width direction of the vehicle so that a gap space may be formed between the side sill and the side member on each side. The second mounting parts and the third mounting parts may be disposed in the gap spaces to connect the side sills to the respective side members.

For example, the first mounting parts, the second mounting parts, and the third mounting parts may be disposed so as to prevent a battery from being displaced in the lateral direction.

For example, the first mounting parts and the second mounting parts may be provided on the front portion of the lower frame to allow the cabin interior and the side members to be coupled at each side of the chassis cab vehicle.

For example, the third mounting parts may be provided on the central portion of the lower frame to allow a rear end portion of the side sills and the respective side members to be coupled at each side of the chassis cab vehicle.

For example, the upper body may include a plurality of upper cross members configured to connect both of the side sills and to extend to the rear of the cabin interior.

For example, a plurality of middle cross members may be configured to connect both of the side members to each other and may be formed in the central portion of the lower frame. The middle cross members may overlap at least one upper cross member.

For example, when the upper body is coupled to the lower frame, the side sills, the upper cross members, and the middle cross members may be interconnected to form a load path for a side collision of the vehicle.

For example, the plurality of upper cross members and the plurality of middle cross members may be formed in parallel with each other.

For example, an open space may be formed at the rear of the cabin interior to connect a loading body capable of loading an object.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
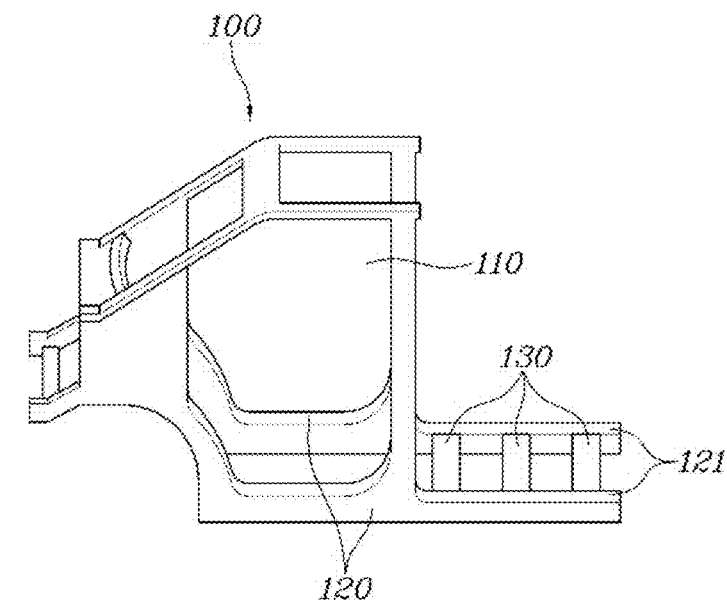
FIG. 1 is a diagram illustrating a configuration of a chassis cab vehicle according to one embodiment of the present disclosure.
Figure 1:
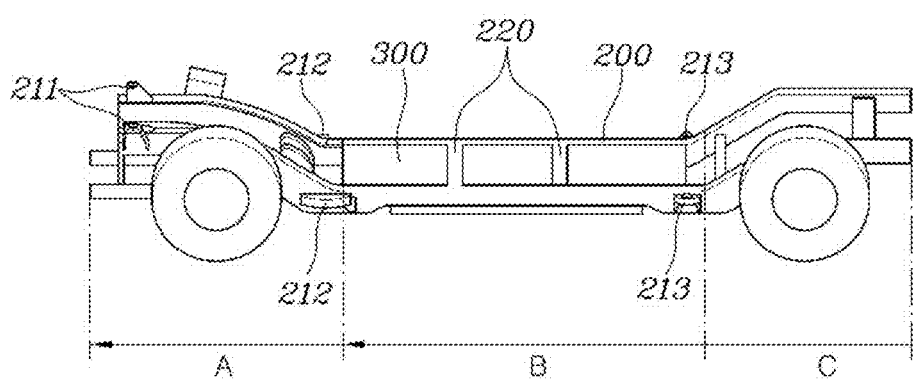

Hereinafter, embodiments disclosed in the present specification are described in detail with reference to the drawings. The same reference numerals are given to the same or similar components throughout the written description and drawings, and a repetitive description thereof has been omitted.

As used herein, suffixes "module" and "portion" for a component of the present disclosure are used or interchangeably used solely for ease of preparation of the specification, and do not have different meanings and each of them does not function by itself.

In the following description of the present specification, where a detailed description of a known related art has been determined to obscure the gist of the present specification, the detailed description thereof has been omitted herein. In addition, the accompanying drawings are merely to aid in understanding the embodiments disclosed in the present specification. The technical spirit disclosed in the present specification is not limited by the accompanying drawings. It should be understood that all modifications, equivalents, and substitutes are included in the spirit and scope of the present disclosure. Terms including ordinal numbers such as first, second, and the like may be used herein to describe various components, but the various components are not limited by these terms. The terms are used only for the purpose of distinguishing one component from another component.

When a component is referred to as being "connected" or "coupled" to another component, the component may be directly connected or coupled to another component, but it should be understood that an additional component may be present between the connected or coupled components. On the contrary, when a component is referred to as being "directly connected" or "directly coupled" to another component, it should be understood that no other component may be present between the connected or coupled components.

Unless the context clearly dictates otherwise, the singular form of terms used herein includes the plural form. When a component, device, element, or the like of the present disclosure is described as having a purpose or performing an operation, function, or the like, the component, device, or element should be considered herein as being "configured to" meet that purpose or perform that operation or function.

In the present specification, the terms "comprising," "having," or the like are used to specify that a feature, a number, a step, an operation, a component, an element, or a combination thereof described herein exists. The terms do not preclude the presence or addition of one or more other features, numbers, steps, operations, components, elements, or combinations thereof.

According to one embodiment of the present disclosure, a chassis cab vehicle is proposed with a structure in which a lower frame and an upper body are coupled, and in which a response structure for a side collision of a vehicle is configurable in the upper body by extending a side sill of the upper body to a rear of a cabin interior of the chassis cab vehicle.

Figure 2:
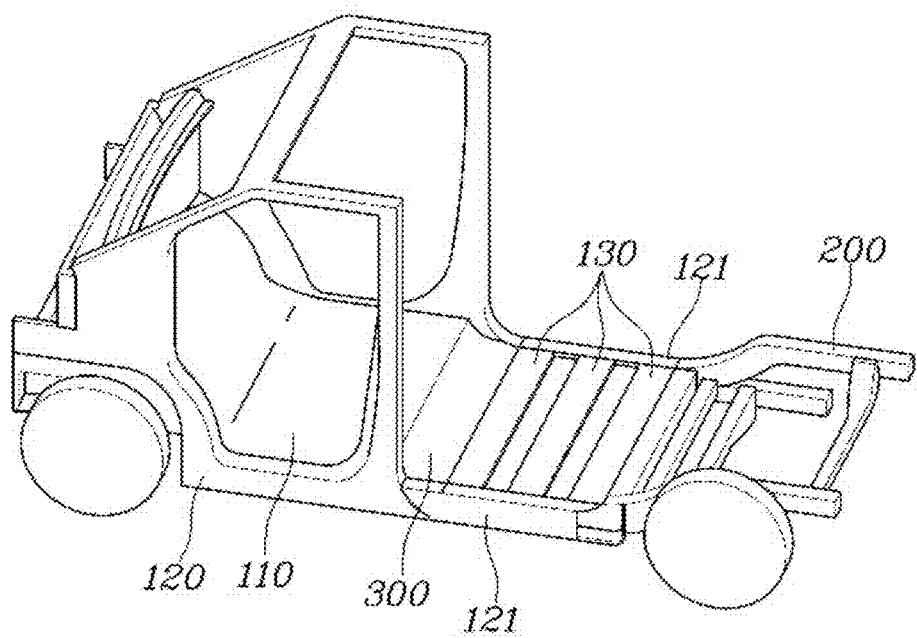
FIG. 2 is a perspective view illustrating the chassis cab vehicle according to one embodiment of the present disclosure.

FIG. 1 is a diagram illustrating a configuration of a chassis cab vehicle according to one embodiment of the present disclosure. FIG. 2 is a perspective view illustrating the chassis cab vehicle according to one embodiment of the present disclosure.

FIG. 1 mainly shows components related to an embodiment of the present disclosure. It should be understood that fewer or more components may be included in implementation of an actual chassis cab vehicle.

Referring to FIG. 1, a chassis cab vehicle according to one embodiment may include a lower frame assembly, i.e., a lower frame with lower frame sections A, B, and C, and an upper body 100.

The lower frame and lower frame sections A, B, and C constitute a lower structure of the chassis cab vehicle and may include a pair of side members 200 extending in a lengthwise direction of the chassis cab vehicle. The lower frame and lower frame sections A, B, and C are a skeleton of the vehicle and support, from below, the upper body 100, a battery 300, and a loading body, which is described below.

More specifically, the lower frame sections A, B, and C include a front lower frame A, a central lower frame B, and a rear lower frame C and may be classified based on a lengthwise or longitudinal front-rear direction of the vehicle. A cabin interior 110 is defined in the upper body 100 in which a passenger and a driver ride in the vehicle and is provided above a midpoint between the front lower frame A and the central lower frame B among the lower frame sections A, B, and C. An open space may be formed above the rear lower frame C from the midpoint of the central lower frame B.

Therefore, a loading body capable for loading an object may be mounted in the open space formed at a rear of the cabin interior 110. The upper body 100 and the lower frame sections A, B, and C are assembled in a vertical decking method, and the loading body may be mounted on the lower frame sections A, B, and C.

In this case, the pair of side members 200 extend in the lengthwise direction of the vehicle in the central lower frame B of the lower frame sections A, B, and C. The high-voltage battery 300 may be coupled between the side members 200 at both sides. The high-voltage battery 300 in one example is disposed and coupled in the central lower frame B of the lower frame sections A, B, and C to provide a low center of gravity stability to the chassis cab vehicle.

In addition, in order for the lower frame sections A, B, and C to maximally lower a position of the battery 300, the central lower frame B of the lower frame sections A, B, and C may be formed having a downward recessed structure or shape. Based on the central lower frame B of the lower frame sections A, B, and C, both end portions may be formed to be bent to position the central lower frame B of each side member 200 to extend outward relative to the front lower frame A. In other words, the lower frame is shaped such that a width of the lower frame decreases from the rear lower frame C to the front lower frame A. A front end of the central lower frame B may be connected to the front lower frame A of the lower frame sections A, B, and C, and a rear end of the central lower frame B may be connected to the rear lower frame C of the lower frame sections A, B, and C. In addition, the central lower frame B of the lower frame sections A, B, and C may be formed parallel to the ground in the lengthwise direction of the vehicle and may be inclinedly connected to the front lower frame A and the rear lower frame C. In addition, heights of the front lower frame A and the rear lower frame C of the lower frame sections A, B, and C are formed to be the same so that driving stability of the vehicle may be increased in a front-rear direction. In addition, a plurality of middle cross members 220 may connect the side members 200 to each other and may be formed in the central lower frame B of the lower frame sections A, B, and C. The plurality of middle cross members 220 connect the side members 200 in a transverse direction so that it is possible to increase a lateral supporting force.

Referring to FIG. 2, the upper body 100 is coupled to the front lower frame A of the lower frame sections A, B, and C and forms the cabin interior 110 in which a passenger and a driver can ride. Generally, the cabin interior 110 of the chassis cab vehicle may be formed in one seating row to load objects at a rear of the cabin interior 110. Side sills 120 are formed in a lower portion at each side of the upper body 100 and may extend to the rear of the cabin interior 110. The side sills 120 thereby respond to a side collision of the vehicle without arranging separate structural bodies for protecting the battery 300 on the side members 200 of the lower frame sections A, B, and C.

More specifically, each side sill 120 may extend from the rear side of the cabin interior 110 to the central lower frame B of the lower frame sections A, B, and C. Instead of separate side sills 120 being connected to the rear side of the cabin interior 110, the side sills 120 at a lower end of the cabin interior 110 extend in the same structure so that connectivity of the upper body 100 may be maximized. Both of the side sills 120 formed on the upper body 100 may overlap the side members 200 in the lateral direction of the vehicle when coupled to the lower frame sections A, B, and C. In this case, a plurality of upper cross members 130, which are crossing members, may be formed to connect the both side sills 120 extending to the rear of the cabin interior 110 to each other. The upper cross members 130 are formed to be perpendicular to the side sills 120 and are positioned above the battery 300 when coupled to the lower frame sections A, B, and C. The plurality of upper cross members 130 is disposed in a width, i.e., lateral or side-to-side direction of the vehicle to increase the lateral supporting force of the side sills 120 extending rearward when a loading body is mounted at the rear of the cabin interior 110. In this case, the plurality of upper cross members 130 and the plurality of middle cross members 220 may be formed in parallel with each other, thereby symmetrically distributing a load based on a center of the lower frame sections A, B, and C.

Therefore, when the lower frame or the lower frame sections A, B, and C and the upper body 100 are coupled to each other, the middle cross members 220 are configured to overlap at least one of the upper cross members 130 so that the side sills 120, the upper cross members 130, and the middle cross members 220 may be connected to each other. In this case, when a side collision of the vehicle occurs, the side sills 120, the upper cross members 130, and the middle cross members 220, which are connected to each other, may form a load path to further increase stability for side protection of the battery 300.

Figure 3:
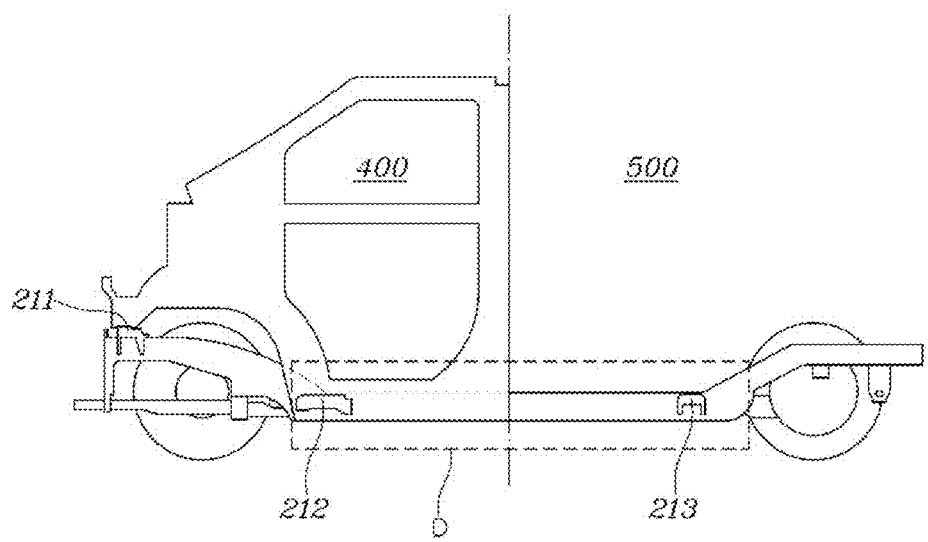
FIG. 3 is a diagram illustrating a side view of a lower frame of the chassis cab vehicle according to one embodiment of the present disclosure in a length direction.

FIG. 3 is a diagram illustrating a side view of the lower frame of the chassis cab vehicle according to one embodiment of the present disclosure in a lengthwise or longitudinal direction of the vehicle.

Referring to FIG. 3, the chassis cab vehicle may be divided into a cabin portion 400 and a loading portion 500. The cabin portion 400 may include the cabin interior 110 of the upper body 100, the front lower frame A, and a portion of the central lower frame B of the lower frame sections A, B, and C. The loading portion 500 may include an extension 121 of the side sills 120 of the upper body 100, a portion of the central lower frame B, and the rear lower frame C of the lower frame sections A, B, and C. Unlike the upper body 100 of a general chassis cab vehicle, the cabin portion 400 may be formed in a structure in which the side sills 120 are extended instead of a structure separated from the loading portion 500.

Specifically, in the present disclosure, a region D for protecting the battery 300 may be formed to extend to the rear of the cabin interior 110 so that the side sills 120 completely surround the battery 300. Therefore, the structure for protecting the battery 300 may be formed to constitute the same lower frame by integrating the upper body 100 and the lower frame sections A, B, and C so that the side sills 120 overlap the side members 200 in the lateral direction of the vehicle when coupled to the lower frame sections A, B, and C. In this way, a side surface of the battery 300 may be protected by securing connectivity to cover the entire side area of the battery 300 without omission.

Hereinafter, the coupling structure of the upper body 100 and the lower frame sections A, B, and C is described.

Figure 4:
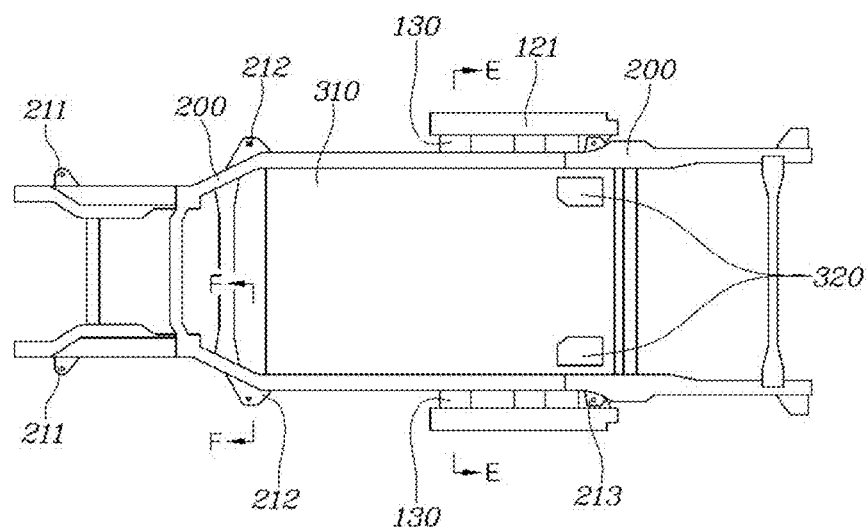
FIG. 4 is a diagram illustrating a top view of a lower frame of the chassis cab vehicle according to one embodiment of the present disclosure when viewed from below.

FIG. 4 is a diagram illustrating the lower frame and lower frame sections A, B, and C of the chassis cab vehicle according to one embodiment of the present disclosure when viewed from below.

Referring to FIG. 4, when the upper body 100 is coupled to the lower frame sections A, B, and C, the side sills 120 may overlap the respective side members 200 in the lateral direction of the vehicle and may be fixed by a plurality of fixing parts. It should be apparent to those having ordinary skill in the art that the plurality of fixing parts are examples and are not necessarily limited to the specific mounting parts shown and described herein. The plurality of fixing parts can be formed in various structures, such as separately configuring a device for coupling the upper body 100 to the lower frame sections A, B, and C.

More specifically, a plurality of mounting or fixing parts include a first mounting part 211, a second mounting part 212, and a third mounting part 213. The mounting parts may be disposed to be spaced apart from each other in the lengthwise direction of the vehicle. All of the first mounting part 211, the second mounting part 212, and the third mounting part 213 may be provided in the lower frame sections A, B, and C, which are the skeleton of the chassis cab vehicle.

Here, the first mounting parts 211 and the second mounting parts 212 are provided on the front lower frame A of the lower frame sections A, B, and C on each side member 200 so that the cabin interior 110 and the side members 200 may be coupled at each side of the chassis cab vehicle. The third mounting parts 213 are provided in the central lower frame B of the lower frame sections A, B, and C on the side members 200 so that the rear end portion of the side sills 120 and the side members 200 are coupled at each side of the chassis cab vehicle. In order to secure a collision space between the side sills 120 and a battery cell 310 when a side collision of the vehicle occurs, the first mounting part 211, the second mounting part 212, and the third mounting part 213 may be disposed to avoid preventing the battery 300 from being displaced in the lateral direction. In one example, the third mounting parts 213 are positioned on side surfaces of electrical parts 320 of the battery 300. Since the third mounting parts 213 are irrelevant to damage to or effect on a battery cell 310 when a side collision of the vehicle occurs, the third mounting parts 213 may be allowed to be positioned on parts other than on the lower frame.

Figure 5:
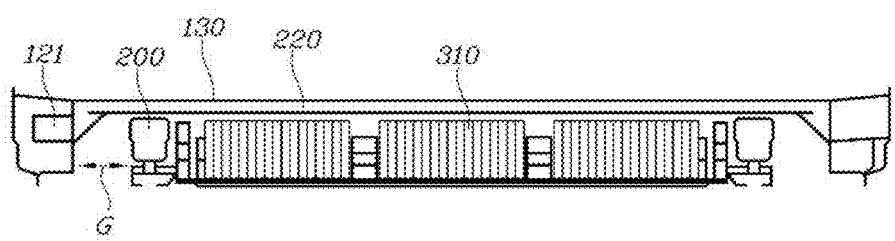
FIGS. 5 and 6 are diagrams illustrating a cross-section of the lower frame taken along line E-E and a cross-section of the lower frame taken along line F-F of FIG. 4, respectively.
Figure 6:
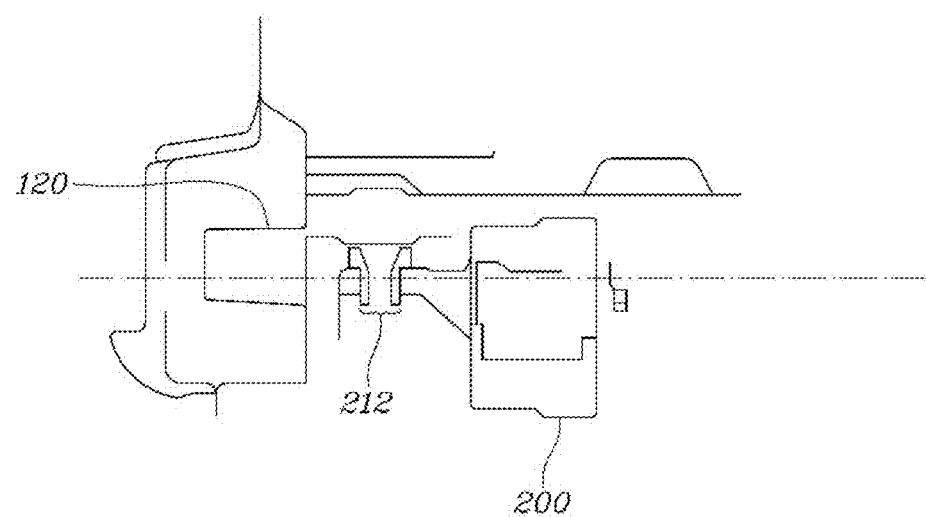

FIGS. 5 and 6 are diagrams illustrating an E-E cross-section of the lower frame and an F-F cross-section of the lower frame of FIG. 4, respectively.

Referring to FIG. 5, a cross-section of the lower frame E-E where the battery 300 is mounted at a position in a lower portion of a loading body can be seen. The side sills 120 are spaced apart from the respective side members 200 in the width direction of the vehicle to form a gap space G between the side sills 120 and the side members 200. The gap space G is a space formed in the width direction of the vehicle in consideration of deformation of the side sills 120 when a side collision of the vehicle occurs and is capable of significantly reducing an impact force. As shown in FIG. 5, the side sills 120, the upper cross members 130, and the middle cross members 220 are connected to each other in the lateral direction so that a protection structure of the battery cells 310 and battery 300 may be formed in longitudinal and lateral directions.

In addition, referring to FIG. 6, it can be confirmed that the second mounting parts 212 are disposed in the gap space G, as can be seen in the cross-section F-F of the lower frame. Although the mounting parts are not seen in FIG. 5, in the front lower frame A of the lower frame sections A, B, and C, the second mounting parts 212 are disposed in the gap space G so that the side sills 120 and the side members 200 may be connected to each other. Further, in the central lower frame B of the lower frame sections A, B, and C, the third mounting parts 213 are disposed in the gap space G so that the side sills 120 and the side members 200 may be connected to each other. In this way, it is possible to reduce a vertical offset between the second mounting parts 212, the position of the third mounting parts 213, and the side sills 120. In addition, it is possible to minimize moment generation of the second mounting parts 212 and the third mounting parts 213 even when a side collision of the vehicle occurs so that support rigidity of the fixing parts or mounting parts may also be increased.

According to the above-described embodiments of the present disclosure, in a vehicle structure in which a lower frame and an upper body are coupled to one another, a response structure for a side collision of a vehicle is configured in the upper body by extending a side sill on each side of the upper body to a rear of a cabin interior. Thus, the side sills are spaced apart from respective side members to reduce an impact force. Also, a separate structure for the side members for protecting the battery is not required so that a weight of a lower frame can be reduced. In addition, a vertical error between the side sill and a position where the upper body and the lower frame are coupled may be reduced so that rigidity of the lower frame can be increased. In addition, as the side sills of the upper body extend to the rear of the cabin interior, the same structure can extend to strengthen connectivity. Also, the side sills overlap the respective side members in the lateral direction of the vehicle so that stability of side protection of the battery can be increased.

The effects obtained by the present disclosure are not limited to the above-mentioned effects. Other effects, which are not mentioned herein can be clearly understood by those having ordinary skill in the art to which the present disclosure pertains from the above description.

Although specific embodiments of the present disclosure have been described and illustrated, those having ordinary skill in the art should appreciate that various alterations, alternatives, and modifications are possible without departing from the technical spirit of the present disclosure as disclosed in the appended claims.

What is claimed is:

1. A chassis cab vehicle comprising:
a lower frame, which constitutes a lower structure of the chassis cab vehicle and is equipped with a pair of side members extending in a lengthwise direction of the chassis cab vehicle;
a battery coupled between the side members; and
an upper body, which is coupled to a front portion of the lower frame to form a cabin interior,
wherein a side sill is formed at a lower end at each side of the upper body and extends to a rear of the cabin interior,
wherein the side sills overlap the respective side members in a lateral direction of the chassis cab vehicle when coupled to the lower frame,
wherein the upper body includes a plurality of upper cross members configured to connect both of the side sills extending to the rear of the cabin interior,
wherein a plurality of middle cross members is configured to connect both of the side members to each other and formed in the central portion of the lower frame, and
wherein the plurality of middle cross members overlaps at least one of the plurality of upper cross members.

2. The chassis cab vehicle of claim 1, wherein:
the lower frame includes a front lower frame, a central lower frame, and a rear lower frame based on a front-rear direction of the chassis cab vehicle; and
each side sill extends from the rear of the cabin interior to a central portion of the lower frame.

3. The chassis cab vehicle of claim 2, wherein the lower frame is shaped such that a width of the lower frame decreases from the rear lower frame to the front lower frame.

4. The chassis cab vehicle of claim 2, wherein the central portion of the lower frame is recessed downward, and wherein both end portions of the central lower frame are bent outward to extend and connect to the front lower frame and the rear lower frame.

5. The chassis cab vehicle of claim 1, wherein the side sills overlap the respective side members in the lateral direction of the chassis cab vehicle and the upper body is fixed by a plurality of fixing parts.

6. The chassis cab vehicle of claim 5, wherein:
the plurality of fixing parts is provided on the lower frame and includes a first mounting part, a second mounting part, and a third mounting part; and
the first mounting part, the second mounting part, and the third mounting part are disposed spaced apart from each other in the lengthwise direction of the vehicle.

7. The chassis cab vehicle of claim 6, wherein:
the side sills are spaced apart from the respective side members in the lateral direction of the vehicle so that a gap space is formed between each side sill and the respective side member; and
the second mounting parts and the third mounting parts are disposed in the gap spaces connecting the upper body to the respective side members.

8. The chassis cab vehicle of claim 6, wherein the first mounting parts, the second mounting parts, and the third mounting parts are disposed to prevent a battery from being displaced in the lateral direction.

9. The chassis cab vehicle of claim 6, wherein the first mounting parts and the second mounting parts are provided on a front portion of the lower frame whereby the upper body and the side members are coupled at each side of the chassis cab vehicle.

10. The chassis cab vehicle of claim 6, wherein the third mounting parts are provided on the central portion of the lower frame whereby a rear end portion of the side sills and the respective side members are coupled at each side of the chassis cab vehicle.

11. The chassis cab vehicle of claim 1, wherein the upper body is coupled to the lower frame so that the side sills, the plurality of upper cross members, and the plurality of middle cross member are interconnected to form a load path for a side collision of the chassis cab vehicle.

12. The chassis cab vehicle of claim 1, wherein the plurality of upper cross members and the plurality of middle cross members are formed in parallel with each other.

13. The chassis cab vehicle of claim 1, wherein an open space is formed at the rear of the cabin interior to connect a loading body capable of loading an object.

14. A chassis cab vehicle comprising:
a lower frame, which constitutes a lower structure of the chassis cab vehicle and is equipped with a pair of side members extending in a lengthwise direction of the chassis cab vehicle;
a battery coupled between the side members; and
an upper body, which is coupled to a front portion of the lower frame to form a cabin interior, wherein a side sill is formed at a lower end at each side of the upper body and extends to a rear of the cabin interior, and wherein the side sills overlap the respective side members in a lateral direction of the chassis cab vehicle when coupled to the lower frame,
wherein the side sills overlap the respective side members in the lateral direction of the chassis cab vehicle and the upper body is fixed by a plurality of fixing parts,
wherein
i) the plurality of fixing parts is provided on the lower frame and includes a first mounting part, a second mounting part, and a third mounting part, and
ii) the first mounting part, the second mounting part, and the third mounting part are disposed spaced apart from each other in the lengthwise direction of the vehicle, and
wherein
i) the side sills are spaced apart from the respective side members in the lateral direction of the vehicle so that a gap space is formed between each side sill and the respective side member, and
ii) the second mounting parts and the third mounting parts are disposed in the gap spaces connecting the upper body to the respective side members.

* * * * *